United States Patent [19]

Palazzetti

[11] Patent Number: 4,697,094
[45] Date of Patent: Sep. 29, 1987

[54] SYSTEM FOR INTERCONNECTING SENSOR AND ACTUATING DEVICES

[75] Inventor: Mario Palazzetti, Avigliana, Italy

[73] Assignee: Fiat Auto S.p.A., Turin, Italy

[21] Appl. No.: 825,234

[22] Filed: Feb. 3, 1986

[30] Foreign Application Priority Data

Feb. 4, 1985 [IT] Italy ................................ 67101 A/85

[51] Int. Cl.[4] ............................................. H02J 13/00
[52] U.S. Cl. ....................................... 307/40; 307/11; 307/35; 370/86; 370/85
[58] Field of Search ......................... 307/11, 29, 40, 34, 307/35, 115; 370/13, 14, 15, 16, 17, 85, 86, 87, 88, 89; 324/51

[56] References Cited

U.S. PATENT DOCUMENTS

| | | | |
|---|---|---|---|
| 3,732,543 | 5/1973 | Rocher et al. | 370/88 |
| 3,879,582 | 4/1975 | White et al. | 370/88 |
| 3,943,283 | 3/1976 | Caragliano et al. | 370/86 X |
| 4,039,757 | 8/1977 | Frisone | 370/88 |
| 4,059,731 | 11/1977 | Green et al. | 370/13 |
| 4,227,178 | 10/1980 | Gergaud et al. | 370/86 X |
| 4,237,553 | 12/1980 | Larsen | 370/89 |
| 4,276,643 | 6/1981 | Laprie et al. | 370/16 X |
| 4,288,871 | 9/1981 | Baugh | 370/86 |
| 4,334,305 | 6/1982 | Girardi | 370/86 |
| 4,383,314 | 5/1983 | Tam | 370/86 |
| 4,388,567 | 6/1983 | Yamazaki et al. | 307/40 |
| 4,435,705 | 3/1984 | Stevens | 370/80 X |
| 4,472,712 | 9/1984 | Ault et al. | 370/85 X |
| 4,538,262 | 8/1985 | Sinniger et al. | 370/85 |
| 4,540,890 | 9/1985 | Gangemi et al. | 307/40 |
| 4,580,261 | 4/1986 | Pelotte | 370/85 |

Primary Examiner—William M. Shoop, Jr.
Assistant Examiner—Shik Luen Paul Ip

[57] ABSTRACT

A system for connecting sensor devices to actuating devices, the system substantially comprising a cable having a given number of signal conducting lines, a number of interface units each designed for assembly between the lines of the aforementioned cable and a respective sensor device or actuating device, and processing means designed to circulate, in the aforementioned cable, signals enabling data to be transmitted between the devices and the processing means.

13 Claims, 7 Drawing Figures

SYSTEM FOR INTERCONNECTING SENSOR AND ACTUATING DEVICES

BACKGROUND OF THE INVENTION

The present invention relates to a system for interconnecting sensor and actuating devices.

In electronic control systems, analogue signal transfer and order distribution have become such a serious problem that the wiring involved often constitutes the most critical part of the system in terms of reliability, complexity (both design and production), weight, fault diagnosis and cost, especially when it comes to transferring analogue signals. Wiring, in fact, may be said to be a real hindrance to the extraordinary potential of electronic systems which, for years now, have continued to register a steady fall in the cost of strictly electronic components, whereas insubstantial wiring development has occurred. On ships and, particularly, aircraft, an attempt has been made to overcome this problem by providing a single back-up wire for conveyed-wave or PCM (pulse code modulation) systems. Though they serve admirably on ships and aircraft, such systems are highly sophisticated and involve such high cost that large-scale application, e.g. for wiring automobiles or industrial vehicles, is out of the question.

SUMMARY OF THE INVENTION

The aim of the present invention is to provide a system for interconnecting sensor and actuating devices, which system has a high degree of reliability, is fairly straightforward in terms of both design and actual wiring, is lightweight and relatively inexpensive, and provides for use of identical modules without need for personalization.

With this aim in view, according to the present invention, there is provided a system for connecting sensor devices to actuating devices, characterised by the fact that it comprises:

- at least one cable having a given number of signal conducting lines;
- a number of interface units, each designed for assembly between the lines on the said cable and a respective sensor or actuating device; and
- processing means designed to circulate, in a first and second line on the said cable, signals cyclically determining connection of each said sensor or actuating device to a third line on the said cable by means of the respective said interface unit, for the purpose of respectively supplying to the said third line a signal depending on a parameter detected by the said sensor device, or for enabling the said actuating device to receive a control signal generated by the said sensor device or by the said processing means.

BRIEF DESCRIPTION OF THE DRAWINGS

A preferred arrangement of the present invention will now be described, purely by way of a non-limiting example, with reference to the accompanying drawings in which.

DETAILED DESCRIPTION OF THE INVENTION

Figure 2:
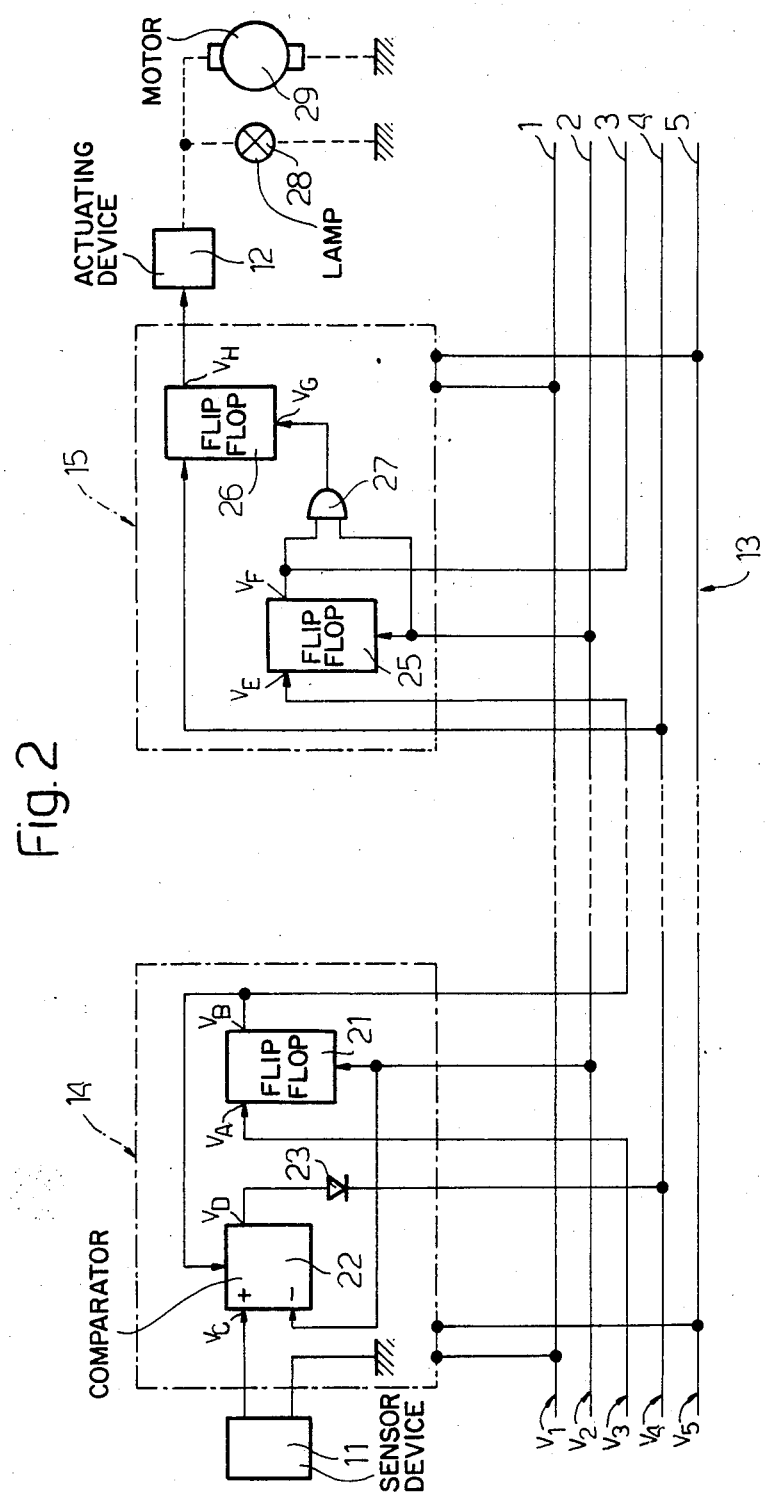
FIG. 2 shows a more detailed block diagram of two details in the FIG. 1 diagram.

Number 10 in FIG. 1 indicates a system for connecting sensor devices 11 to processing means 16 (described in more detail later on) for controlling actuating devices 12. System 10 substantially comprises:

- a cable 13 having a given number of signal conducting lines (respectively numbered 1, 2, 3, 4 and 5 in FIG. 2);
- a number of interface units, those located between sensor devices 11 and cable 13 being numbered 14, and those between actuating devices 12 and cable 13 being numbered 15; and
- the aforementioned processing means 16 which is designed, for among other functions, and as shown more clearly in FIG. 2, to circulate signals to enable predetermined sensor 11 and actuating 12 devices to be connected to the said processing means 16. Note, in particular, the loop configuration of cable 13 which is interrupted solely by the insertion within such loop of processing means 16 advantageously in the form of a microprocessor unit.

FIG. 2 shows structural examples of interface units 14 and 15. In more detail, unit 14 substantially comprises a flip-flop 21, a comparator 22 and a diode 23. More specifically, flip-flop 21 (D type) presents an input and output series-connected over line 3, which as seen in FIG. 2 is interrupted, and a clock input connected to line 2. The output $V_B$ of flip-flop 21 is also connected to an enabling input of comparator 22 which presents a non-inverting input (+) connected to a terminal on sensor device 11, and an inverting input (−) connected to the said line 2. The other terminal on sensor device 11 is grounded, whereas the output $V_D$ of comparator 22 is connected, via diode 23, to line 4. Unit 14 is supplied (powered) by lines 1 and 5 which, in this specific case, are located at the opposite ends of cable 13. Interface unit 15 substantially comprises a pair of flip-flops 25 and 26 (D type) and a two-input AND logic gate 27. In more detail, flip-flop 25 presents an input $V_E$ and output $V_F$ series-connected over interrupted line 3, the said output also being connected to a first input of gate 27. Line 2 is connected to both a clock input of flip-flop 25, and a second input of gate 27 the output of which is connected to the clock input of flip-flop 26. The said flip-flop 26 also presents an input connected to line 4, and an output $V_H$ connected to actuating device 12. In the example shown, actuating device 12 has an output controlling the lighting of lamp 28 or the supply of motor 29.

Figure 3:
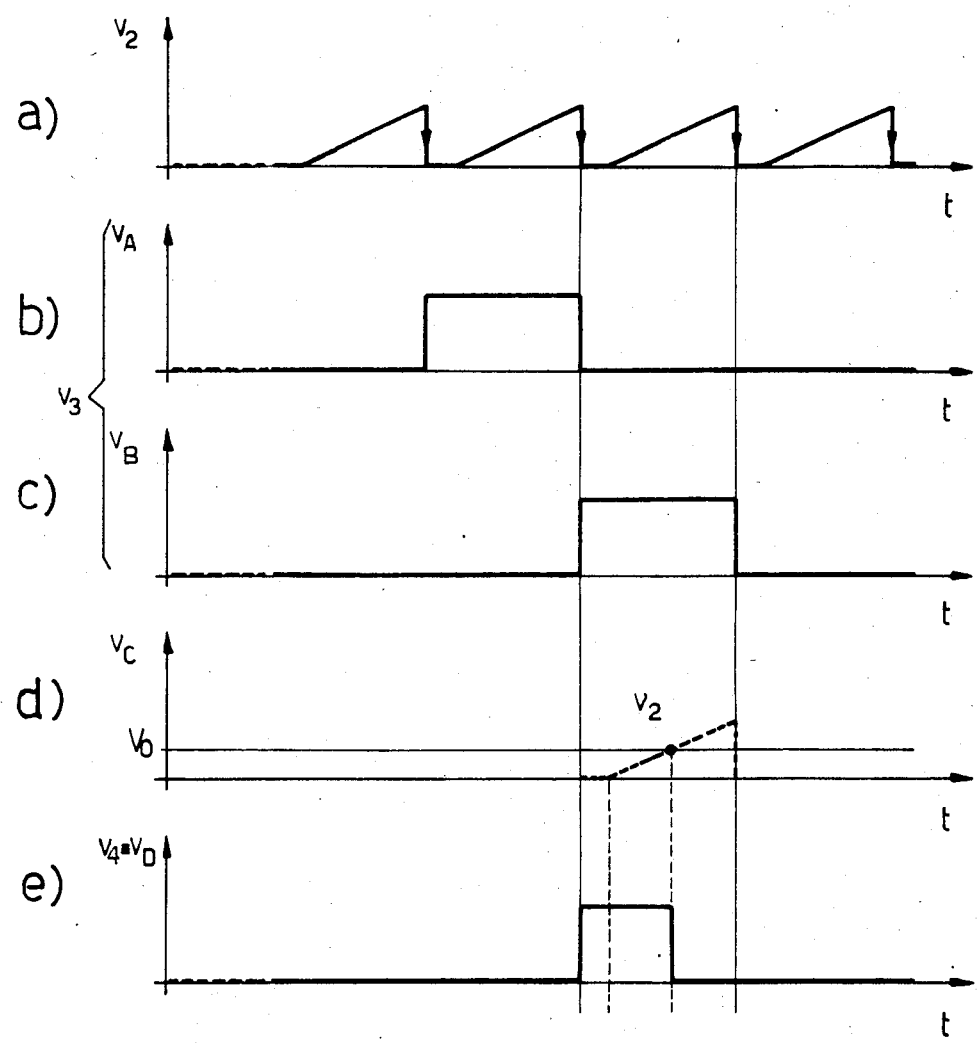
FIGS. 3 and 4 show time graphs of a number of parameters detected in the FIG. 2 block diagram, FIG. 3 showing time graphs for interface unit 14 and FIG. 4 time graphs for interface unit 15.
Figure 4:
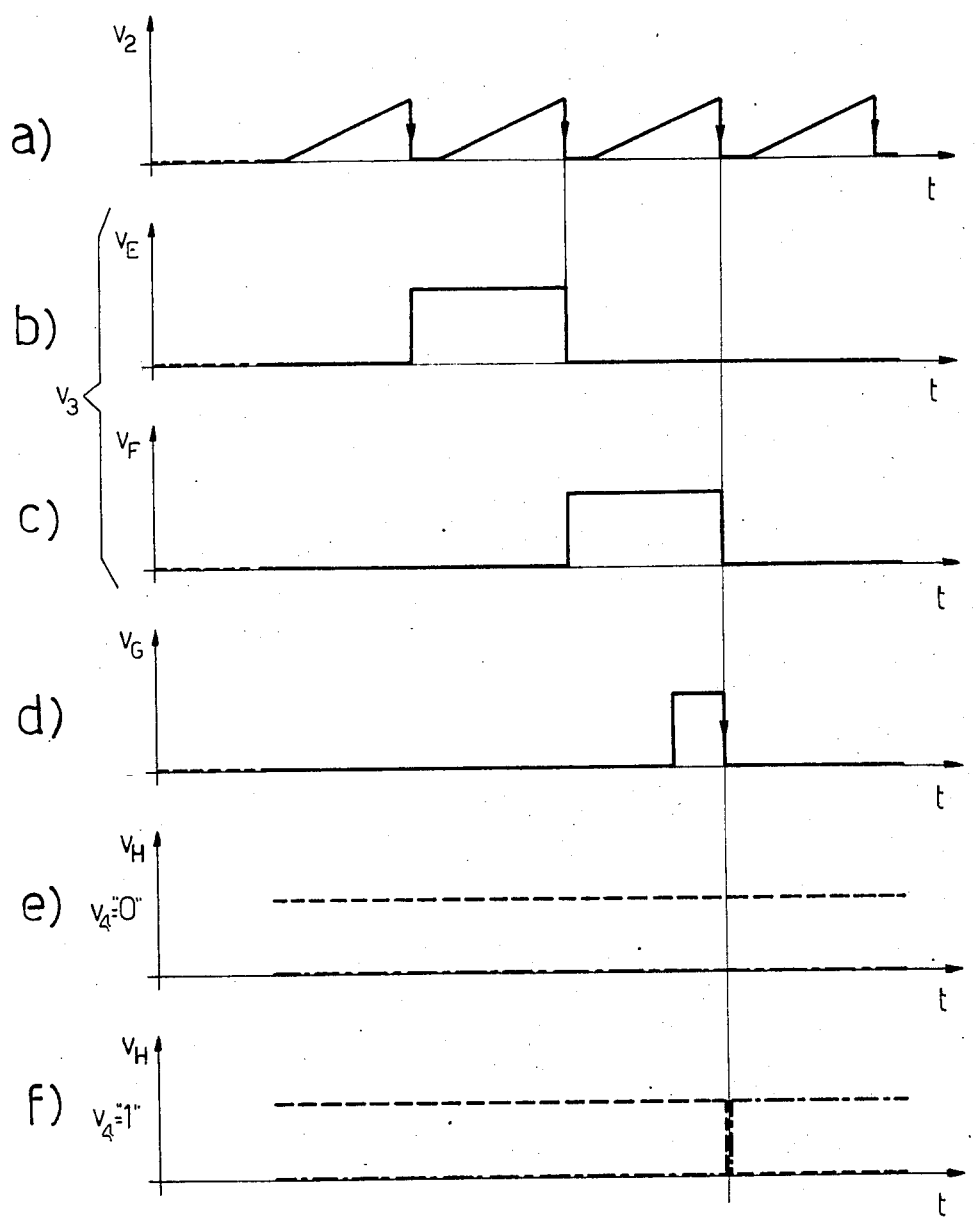

FIGS. 3 and 4 show time graphs of a few of the parameters shown in FIG. 2.

Figure 1:
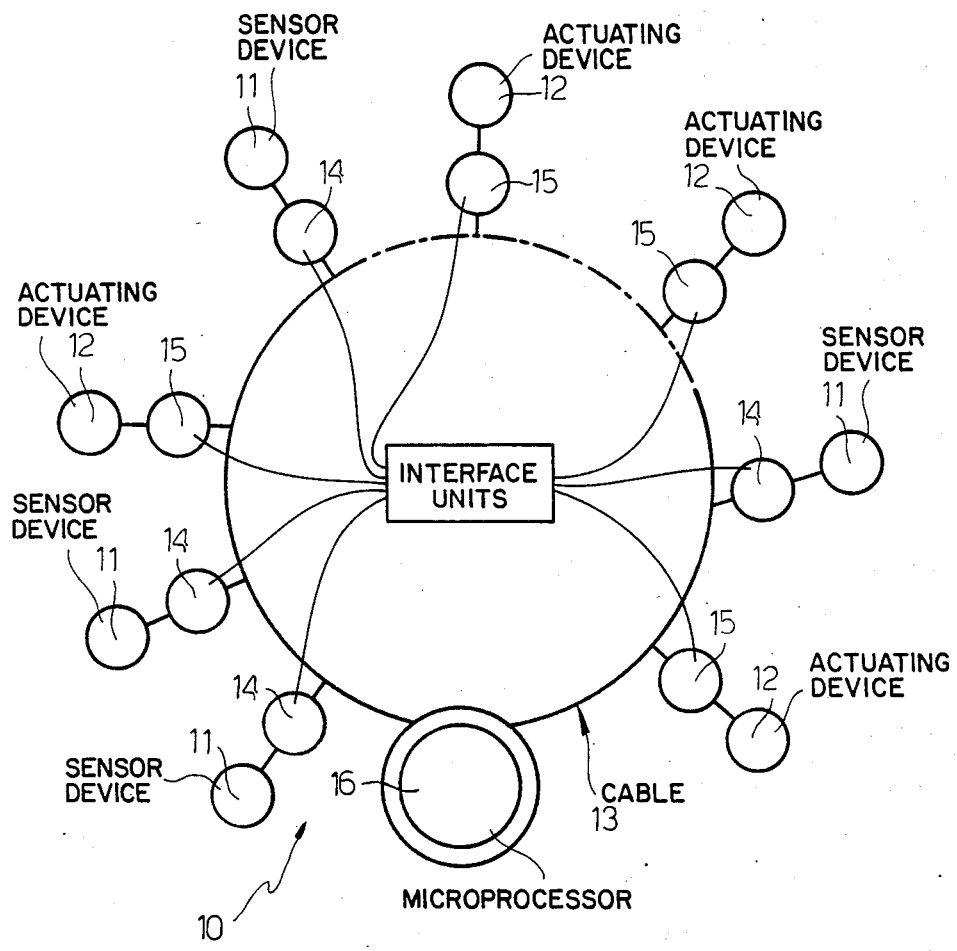
FIG. 1 shows a block diagram of a system in accordance with the present invention.
Figure 5:
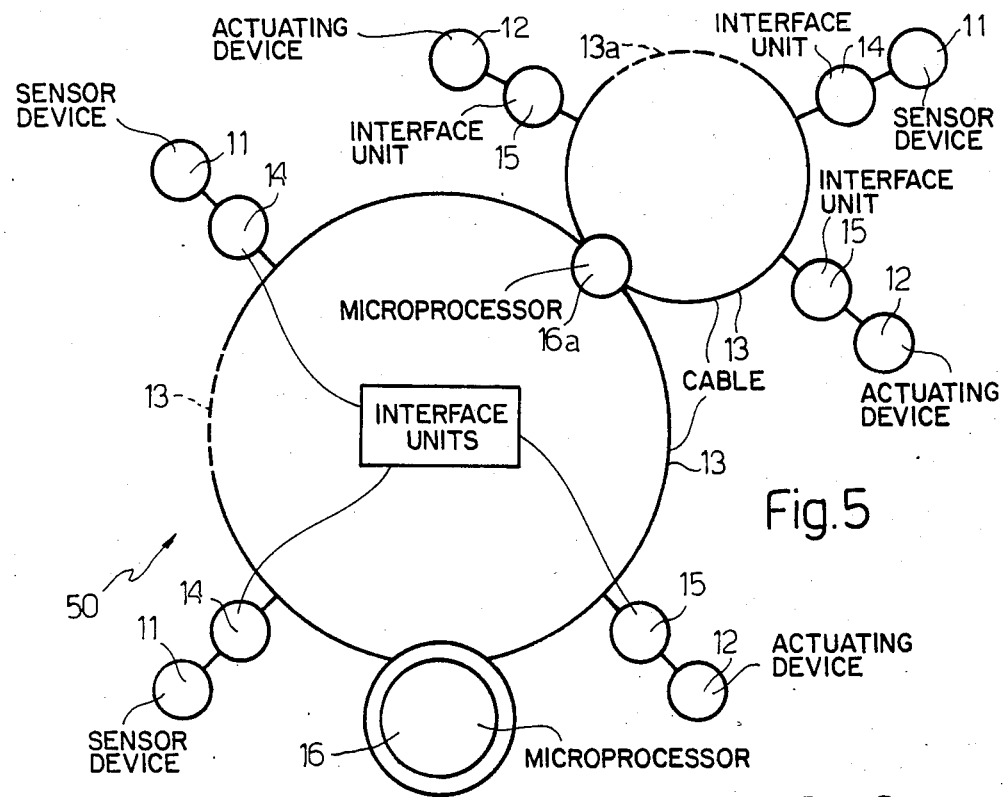
FIGS. 5, 6 and 7 show system arrangements equivalent to that described with reference to FIG. 1.
Figure 6:
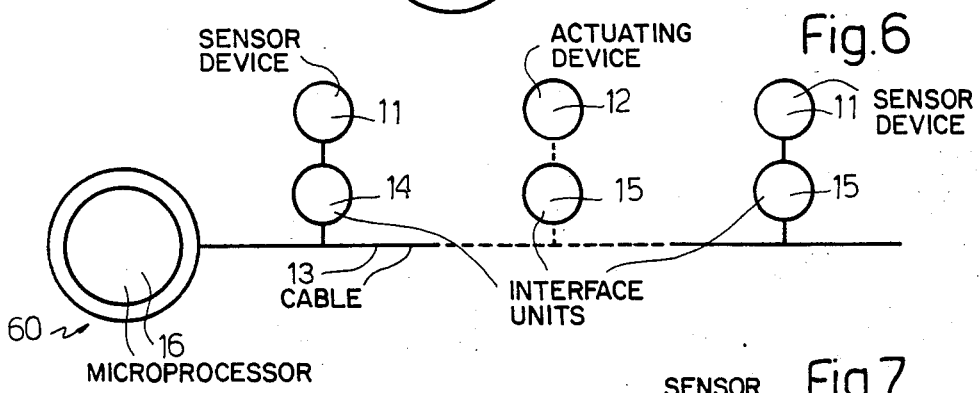
Figure 7:
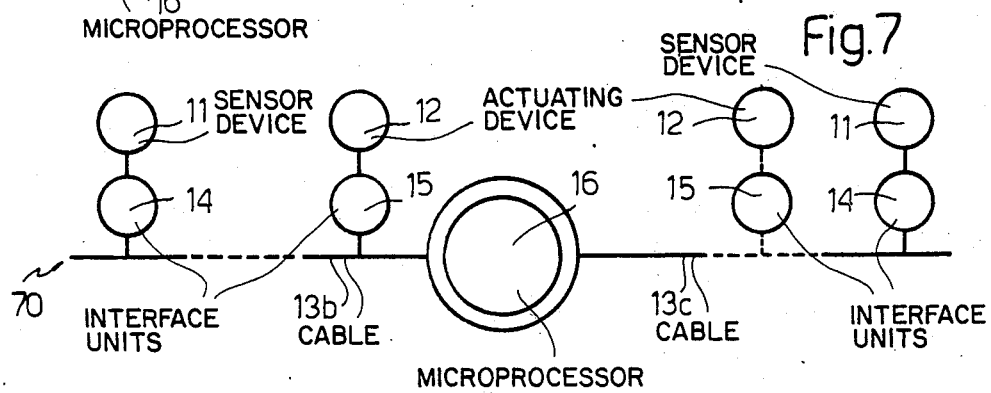

FIGS. 5, 6 and 7 show respective systems 50, 60 and 70, which are equivalent in all respects to system 10 in FIG. 1 and which employ the same numbering system for sensor and actuating devices 11 and 12, connecting cable 13, interface units 14 and 15, and processing units 16. The only difference between system 10 of FIG. 1 and system 50 of FIG. 5 substantially consists in that system 50 is a twin-loop configuration employing an auxiliary cable 13a connected to cable 13 at auxiliary processing means 16a which may also comprise microprocessor logic units.

System 60 in FIG. 6 presents an equivalent solution by way of an open cable 13 branching off from one side of processing unit 16.

System 70 in FIG. 7 presents another solution and includes a pair of cables, 13b and 13c, branching separately from processing unit 16 and therefore independently controlled thereby.

Operation of the system in accordance with the present invention will first be described with reference to FIGS. 1 to 4. Having determined which sensor devices 11 and actuating devices 12 are to be interconnected, the cable is arranged as shown in FIG. 1, each sensor device 11 and actuating device 12 being assigned a respective interface unit 14 or 15. Examples of sensor devices are: level or temperature sensors, or even switches. Examples of actuating devices: are indicator lights, headlights, motors etc. In the broadest sense, operation of system 10 substantially involves cyclically picking up and, at an appropriate time, transferring data produced by each sensor device 11 to the processing means 16, and supplying orders, at an appropriate time, to predetermined actuating devices 12 by means of its associated interface unit 15. Such operation will be more readily understandable by examining the typical behaviour of two associated interface units 14 and 15 as shown in FIG. 2. The said units are powered by a source of current by cable 13, in particular, by lines 1 and 5 which, in the case of a flat cable 13, are conveniently located at respective opposite ends of the cable, in such a manner as to safeguard lines 2, 3 and 4 against outside interference. Line 2 is constantly supplied with a substantially saw-tooth signal $v_2$ (FIGS. 3a and 4a) presenting a rising edge, followed by a vertical falling edge back to zero, in turn, followed by a zero volt interval of a given time length, then another rising edge. Saw tooth signal $v_2$ performs two functions. The rising portion is compared with the signal generated by sensor device 11, while the falling edge serves as a clock signal for updating the data in flip-flop 21 as regards unit 14, or in flip-flops 25 and 26 as regards unit 15.

Signal $v_3$ (FIGS. 3b and 3c, 4b and 4c) may be logic "1" or logic "0" in value, and is generated by processing unit 16. At each falling edge of signal $v_2$, signal $v_3$ is memorized by only one of the flip-flops of all the units connected to cable 13, the said flip-flops thus constituting a known type of loop counter. In other words, signal $v_3$ on line 3 constitutes an enabling signal for enabling operation of a specific interface unit 14 or 15, when signal $v_3$ presents a logic level "1" at the output of respective flip-flop 21 or 25. This permits unit 14 to be interrogated one at a time for picking up the data generated by corresponding sensor device 11, or, similarly, it permits equally selective enabling of units 15 for transmitting any control signals to corresponding actuating devices 12.

Line 4 of cable 13 is therefore supplied with a signal which depends on the data detected by sensor device 11 (FIG. 3c), or which is designed to control actuating device 12 (FIGS. 4e and 4f).

The behaviour of units 14 and 15 will now be examined in more detail.

Interface unit 14 converts the voltage signal received from sensor device 11 into a corresponding pulse length $v_D$, supplied to line 4 via diode 23. Such conversion of the sensor voltage signal into a corresponding signal pulse having a length proportional to the voltage value of the sensor signal is achieved by means of comparator 22, which compares the voltage signal $v_C$ from the sensor at its own non-inverting input (+) with the rising edge of the saw tooth signal from line 2 of the cable 13 and supplied to the inverting input (−) of the comparator, (FIGS. 3b and 3c). The output of comparator 22 therefore is a pulse signal $v_D$ the length of which is proportional to the voltage value ($V_o$) detected by sensor device 11. This operation is only performed when comparator 22 is enabled, i.e. when the enabling input of comparator 22 presents a logic "1" signal from the output $v_B$ of flip-flop 21, which, as already mentioned, occurs only once within each scanning cycle of the loop formed by cable 13. Interface 15 also has a memory function served by flip-flop 26, bearing in mind that an actuating function, e.g. lighting lamp 28 or supplying motor 29, cannot be performed within the brief time during which interface 15 is cyclically enabled. Interface unit 15 is enabled via flip-flop 25 which, as already mentioned, constitutes a station on the said loop counter. Signal $v_H$ controlling actuating device 12 may be logic "1" or "0". Switching from one logic level to the other, accompanied by a corresponding switch in the control of actuating device 12, e.g. lamp 28 on or off, occurs at the falling edge of clock signal $v_G$ and depends on the corresponding value, at that moment, of signal $v_4$. That is to say, if signal $v_4$ is at logic level "0" (FIG. 4e), the output of flip-flop 26 does not switch and the corresponding signal $v_H$ retains its former level. If, on the other hand, signal $v_4$ is at logic level "1" (FIG. 4f), at the falling edge of signal $v_G$, the output of flip-flop 26 switches, and the corresponding signal $v_H$ switches from logic level, "1" to "0" (dash line) or from logic level "0" to "1" (dot-and-dash line).

As processing unit 16 obviously provides for an extremely fast control cycle of all interface units 14 and 15, e.g. in the space of a few tens of milliseconds, the signal detected by a sensor device 11 may be assumed to be transmitted more or less instantaneously by the associated interface unit 15 to the corresponding actuating device 12.

To prevent a number of interface units from being enabled simultaneously, processing unit 16 could, at the end of each enabling cycle, conveniently circulate a logic "0" signal over line 4 of the said loop counter, in such a manner as to nullify non-intentioned enabling of flip-flops in each unit 14 or 15.

One of the most significant equivalent arrangements of the present system is the one shown in FIG. 5. In this case, instead of being a single-loop configuration, system 50 presents two loops with a single contact point. Processing unit 16a, located at the said contact point, provides for transferring data from main cable 13 to auxiliary cable 13a. In like manner, each time the loop counter signal on line 13 reaches processing unit 16a, enabling of the interface units connected to loop 13a is moved forward one step. Such a configuration may be particularly useful in cases where updating of the data detected by sensor devices 11, or control of actuating devices 12 connected to cable 13a, may be performed at a slower rate as compared with the checking rate adopted for the corresponding devices connected to cable 13.

Another possible equivalent solution is system 60 as shown in FIG. 6. In this case, having an open cable 13, flip-flop enabling signal $v_3$ must be generated by unit 16 at the end of each control cycle.

System 70 in FIG. 7 may be considered both as an equivalent solution to that of FIG. 6 with the addition of a further open branch, and as an emergency operating situation on system 10 in FIG. 1. In fact, should cable 13 in FIG. 1 inadvertently be cut, the resulting configuration would be identical to that of FIG. 7, in which case, the processing unit 16, sensor devices 11 and actuating devices 12 will still be operative, providing enabling pulses for the flip-flops in interface units 14 and 15 by means of another cable are provided by means of another cable.

The advantages of the systems in accordance with the present invention will be clear from the foregoing description.

In particular, the possibility of employing a single cable for connecting all the sensor and actuating devices drastically simplifies the wiring, while at the same time drastically reducing cost with no impairment in reliability. Furthermore, should it be possible to use the ground wire as a return wire, four-line cables may be employed in place of the five-line above described.

The addition of a new sensor and/or actuating device would not seriously complicate the system, except for updating processing unit 16 which must be informed as to how the new signals associated with the additional sensor and/or actuating devices are to be handled.

Reliability could also be further improved by employing only high-level signals, or cables with optical-fibre lines.

A type of system in accordance with the present invention obviously provides for low-cost manufacture and, consequently, large-scale application, for example, in the automotive and industrial vehicular industries.

To those skilled in the art it will be clear that changes may be made to systems 10, 50, 60, 70 as described herein without, however, departing from the scope of the present invention.

One particular system configuration equivalent to those described herein could be for interconnecting a switch panel, an indicator light panel and a series of open/closed actuating devices and open/closed sensor devices. This exemplifies a standard electrical panel for which a system may be devised so that a processing unit such as 16 in the foregoing description may be dispensed with. The said unit, in fact, may be constituted of no more than a stable oscillator for generating pulses for updating the data exchanged with the interface units. A typical configuration could be as shown in FIG. 5, with unit 16 removed and unit 16a replaced by the said oscillator., in which case, all the sensor and/or actuating devices in the system would be connected, in due order, to cable 13, whereas cable 13a would be connected with all the indicator lights to be contacted by the said sensor devices 11, and with the switches to be contacted by the said actuating devices 12. Furthermore, an enabling signal must be circulated synchronously over both cable 13 and cable 13a, in such a manner as to cyclically connect the units on cable 13 to the corresponding units on cable 13a.

Finally, the time interval between the end and start of saw-tooth signal $v_2$ may be employed for sending given check signals onto the line, particularly for checking the actuator.

The solution proposed in accordance with the present invention is also valid and competitive when integrated in one CHIP. In which case, a few of the aforementioned safety provisions may be avoided, and reliable grid, star or mixed macrocircuit structures may be formed easily and cheaply.

I claim:

1. A system connecting with sensor devices for controlling operation of actuating devices comprising at least one cable having a preselected number of signal conducting lines, a plurality of interface units comprising flip-flop circuit containing counter stations, each of said interface units connected between said conducting lines of said cable and a respective sensor and actuating device, first means providing scanning signals, during scanning cycles of said stations, on first and second of said signal conducting lines for cyclically and sequentially enabling, by way of said interface units, connection of said sensor and actuating devices to a third line of said cable, which said third line is supplied with a sensing signal which is a function of a parameter detected by said sensor devices, second means in the interface units associated with said sensor devices for providing an input signal to third means in associated interface units for said actuating devices, said second and third means being like means in series connection in said second line comprising an interrupted and thus a noncontinuous line, a preselected one of the interface units for a preselected actuating device being selectively operated under control of a preselected sensing device as a function of said sensing signal supplied to said third line and by the scanning signal on said first and second lines.

2. A system as claimed in claim 1, wherein in the counter stations there are D type flip-flop circuits.

3. A system as claimed in claim 1, wherein the interface unit associated with the sensor device includes means for converting a voltage signal produced by said sensor device into a signal having a length which is a function of the voltage provided by the sensor device, said converting means being enabled by a signal generated by the flip-flop in the station associated with said sensor.

4. A system as claimed in claim 3, wherein said converting means comprises a comparator having a first input connected to the said sensor device and a second input connected to said first line supplied with an electrical signal of substantially saw-tooth wave form.

5. A system as claimed in claim 1, wherein said interface units associated with said actuating devices comprise memory means for controlling operation of an associated actuating device.

6. A system as claimed in claim 5, wherein said memory means comprises a flip-flop circuit.

7. A system as claimed in claim 6, wherein the said flip-flop circuit includes a D type flip-flop.

8. A system as claimed in claim 1, wherein said cable extending substantially in a loop.

9. A system as claimed in claim 1, wherein said first means comprises a processing means and wherein a plurality of cables are provided, each closed substantially in a loop about a processing means to define a single network constituted of said cables interconnected by said processing means.

10. A system as claimed in claim 1, wherein the signal conducting lines of the cable are optical fibre lines.

11. A system as claimed in claim 9, wherein said processing means comprise microprocessor means.

12. A system according to claim 1 wherein said interface units for said sensor and actuating devices are in direct parallel connection to all the lines of said cable, which lines are continuous except for said second line which is discontinuous.

13. A system according to claim 12, wherein the cable is a five line cable, the third and fourth of which are voltage supply lines for said interface units.

* * * * *